United States Patent [19]

Kam

[11] Patent Number: 4,991,088
[45] Date of Patent: Feb. 5, 1991

[54] METHOD FOR OPTIMIZING UTILIZATION OF A CACHE MEMORY

[75] Inventor: Edward O. K. Kam, Fremont, Calif.

[73] Assignee: VLSI Technology, Inc., San Jose, Calif.

[21] Appl. No.: 277,871

[22] Filed: Nov. 30, 1988

[51] Int. Cl.⁵ .................... G06F 9/30; G06F 13/00; G06F 12/00
[52] U.S. Cl. ................... 364/200; 364/900; 364/957.1; 364/964.22; 364/964.2; 364/964; 364/262.4; 364/254.3; 364/243.4; 364/243.41; 364/243.42
[58] Field of Search ... 364/200 MS File, 900 MS File, 364/300

[56] References Cited

U.S. PATENT DOCUMENTS

| | | | |
|---|---|---|---|
| 4,445,177 | 4/1984 | Bratt et al. | 364/200 |
| 4,493,027 | 1/1985 | Katz et al. | 364/200 |
| 4,523,276 | 6/1985 | Maejima et al. | 364/200 |
| 4,646,233 | 2/1987 | Weatherford et al. | 364/200 |
| 4,764,861 | 8/1988 | Toshiterushibuya | 364/200 |
| 4,858,115 | 8/1989 | Rusterholz et al. | 364/200 |
| 4,873,630 | 10/1989 | Rusterholz et al. | 364/200 |

Primary Examiner—Michael R. Fleming
Assistant Examiner—Gopal C. Ray
Attorney, Agent, or Firm—Flehr, Hohbach, Test, Albritton & Herbert

[57] ABSTRACT

A method is provided for minimizing cache misses in a compiled computer program having loop instructions. The compiled computer program is examined to identify a set of compiled loop instructions which is smaller than a cache memory block. The set of compiled loop instructions may straddle two blocks of main memory, which would cause cache misses when the program is executed. The identified set of compiled loop instructions is therefore positioned to fall entirely within the boundaries of a block of main memory so that cache misses are avoided when the set of compiled loop instructions is executed. Loop-invariant instructions are removed from the set of compiled loop instructions. When blocks of the main memory unit are mapped into the cache memory in a set-associative manner, external-call locations are mapped into different rows of the main memory then the corresponding loop instructions. As a result, when blocks of main memory are transferred to the cache memory unit, cache misses are avoided.

5 Claims, 4 Drawing Sheets

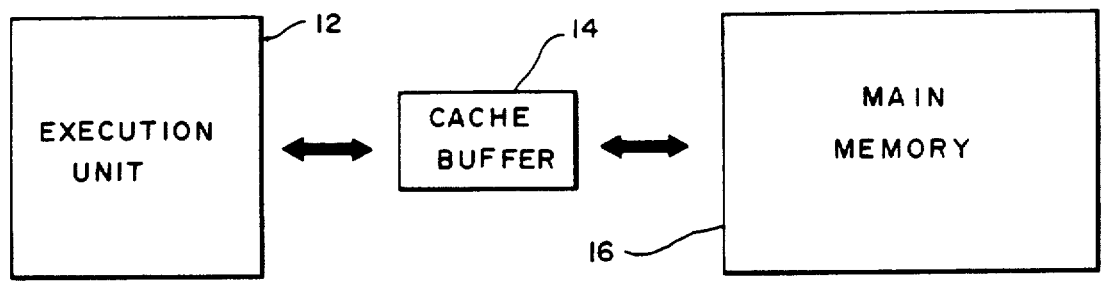
FIG.—1
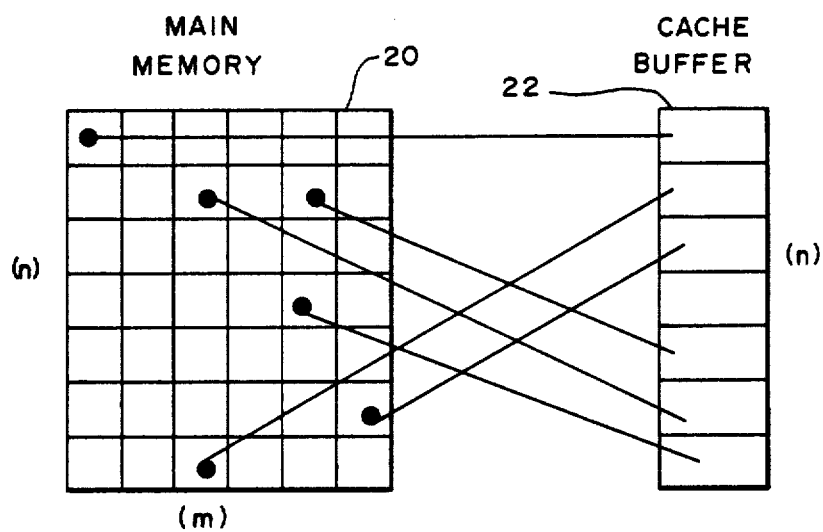
FIG.—2
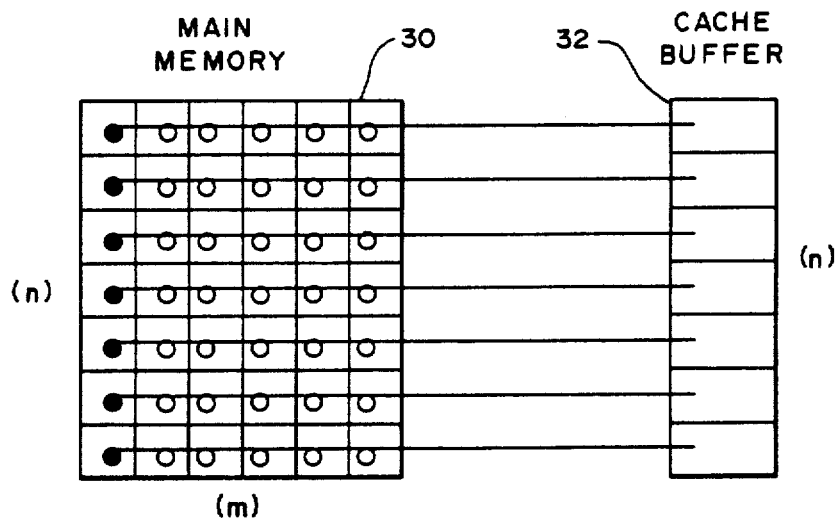
FIG.—3

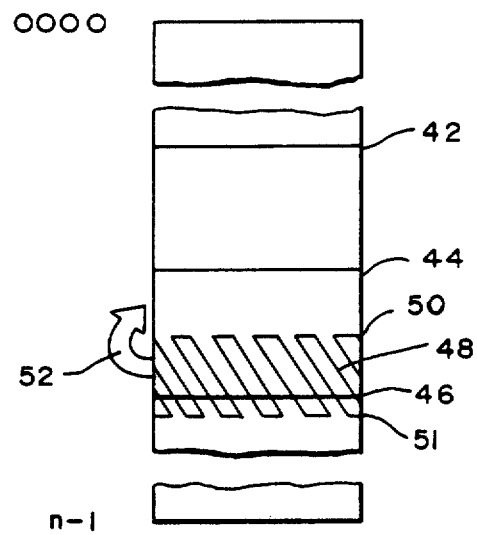
FIG.—4
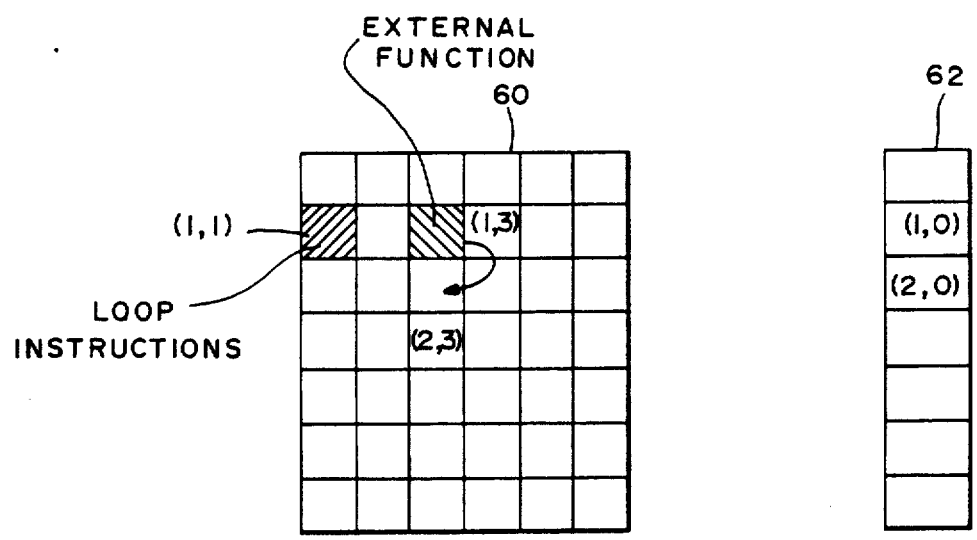
FIG.—5

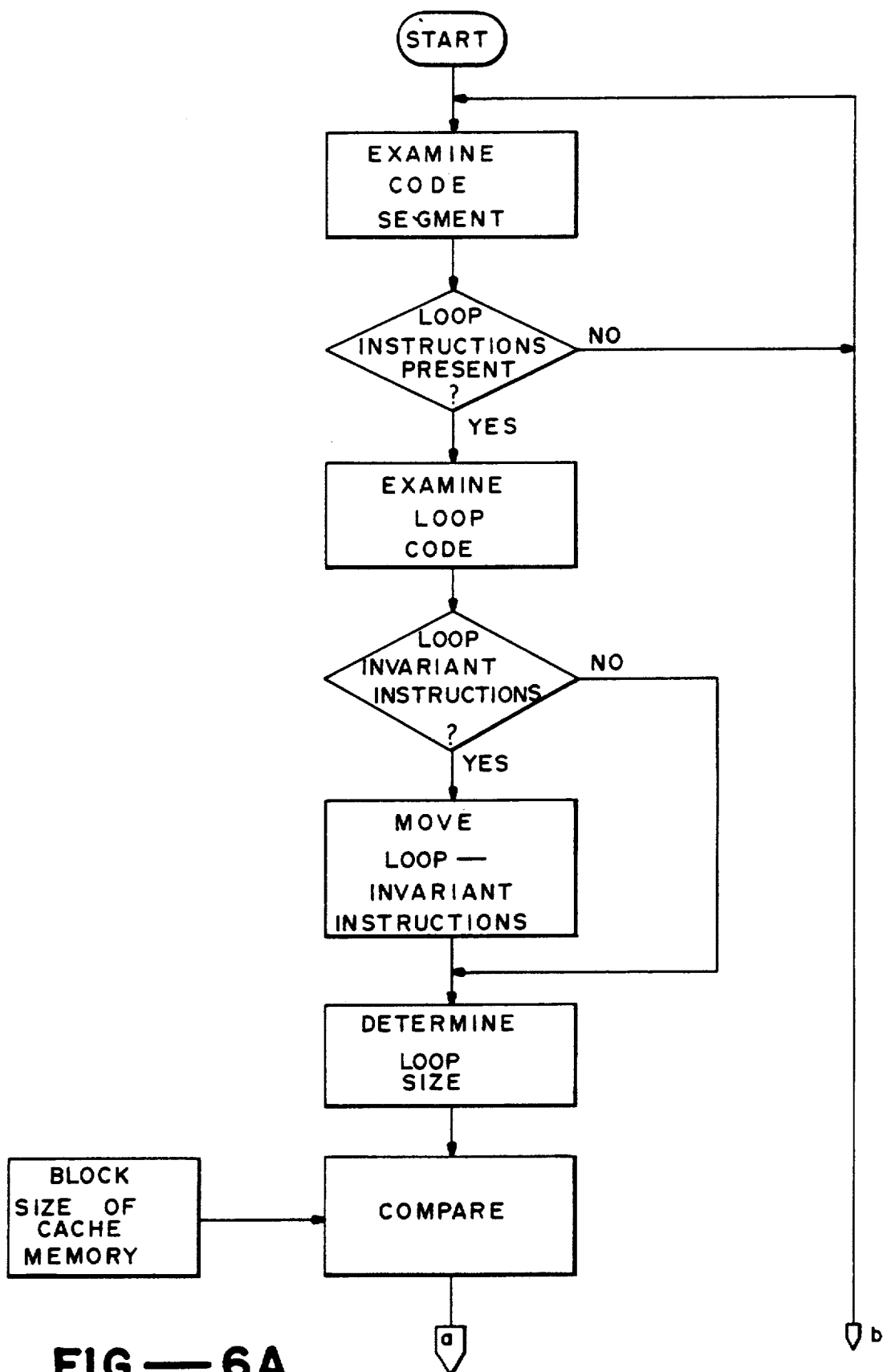
FIG.—6A

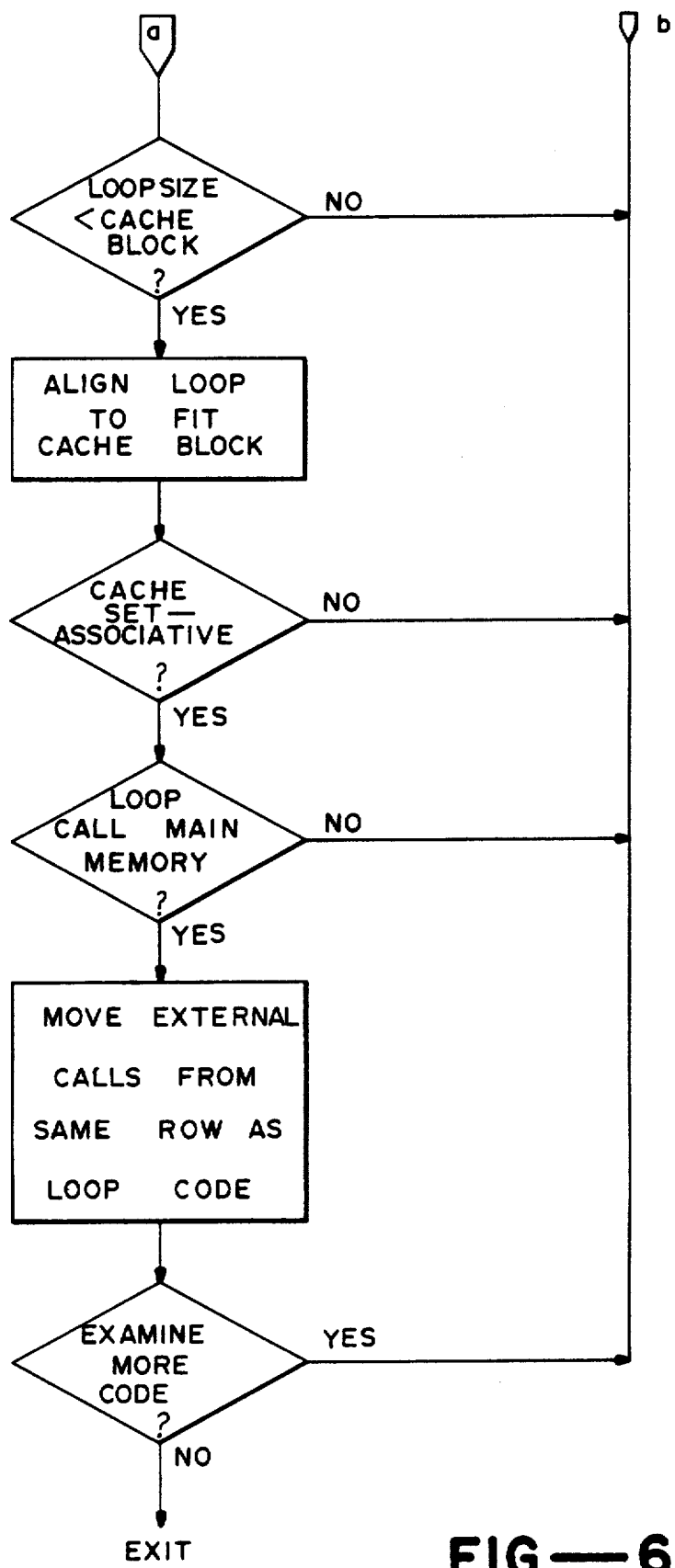
FIG.—6B

METHOD FOR OPTIMIZING UTILIZATION OF A CACHE MEMORY

BACKGROUND OF THE INVENTION

1. Field of the Invention. This invention relates to methods for optimizing operation of a computer system, and more particularly, to methods for optimizing compiling of programs to minimize times when data is not available in a cache memory.

2. Prior Art. A cache memory is a fast memory used to collect data and instructions from slower main memory storage units. Computer architectures use cache memory storage units for intermediate storage of data and instructions. Portions of the contents of a main memory unit can be transferred, or mapped, from the main memory unit to a cache memory unit by several mapping techniques. For direct mapping, designated portions of the contents of the main memory unit are transferred directly to corresponding cache memory locations. For associative mapping, designated portions of the contents of the main memory unit are transferred to any locations in a cache memory. For set-associative mapping, each modulo (n) group of (m) blocks in the main memory is mapped into a corresponding row or block of the cache memory.

It is a well-known characteristic of computer programs that a segment of a computer program, which spans several instruction cycles, refers to and requires access to only certain memory locations. These memory locations tend to be clustered in particular, relatively small areas of memory. Therefore, relatively small, very fast memories may be advantageously used to handle memory references and accesses. This suggests the use of a cache memory unit to permit information to be stored in a relatively small memory unit, which has faster access time than the main memory units, so that programs can be executed faster. A cache memory can contain instructions and data. A computer system with a cache memory unit examines the current address and the next address. If the required information is contained in the cache memory unit, execution is fast. If the required information is not within the segment of main memory currently held by the cache memory unit, the control logic for the system automatically finds and loads the information into the cache memory unit for execution of the program instruction.

A performance parameter which is of particular concern is the ratio of cache misses to cache hits, where a cache miss is defined as a reference to memory which cannot be satisfied by the contents of the cache memory. A cache hit is defined as a reference to memory which can be satisfied by the contents of the cache memory. Since the size of the cache memory unit is only a fraction of the size of a main memory unit, sometimes it is necessary to fill the cache memory unit with new information from the main memory unit. In that case, data which has been previously stored in the cache memory must be replaced, or overwritten, to accommodate new information. Therefore, a cache miss is the result of a first-time requirement for memory information or a subsequent requirement for information which has been overwritten in the cache memory.

One particular technique to increase cache hits is to load forward memory information, that is, to load the information from a number of consecutive memory locations of a main memory unit into a cache memory unit when a first cache miss is encountered. The number of consecutive main memory locations, the contents of which are located in a cache memory, depends on the cache block size, where cache block size is set to be a power of 2. The limit on block size is the traffic ratio, which is defined as the ratio of bus traffic in bits per second of a system with a cache unit memory to bus traffic of a system without a cache memory unit. The traffic ratio measures the effectiveness of a cache memory unit in reducing main memory bandwidth, that is, the product of the number of bits per second and their speed. System bandwidth is defined as the word length of a memory multiplied by the number of words that can be referenced by the system in one second. This technique is particularly useful for an instruction cache memory, where a high percentage of memory access operations are sequential.

A compiler is a computer program which processes a program written in a source language by translating the program into an equivalent program in another, target language, which is often a machine instruction set. Compilation includes four basic steps: an analysis step; and intermediate code generation step; a code optimization step; and a final code generation step.

The code optimization step for a compiler is a process whereby a translated program is made to perform as efficiently as possible. Optimization of computer code involving loop functions is extremely important because instructions within a loop are repeatedly executed N times, where N is the number of times an instruction sequence is executed in a loop routine. The main techniques for optimizing loop performance is loop-invariant code motion, which takes any expression that yields the same result independently of the number of times a loop routine is executed and places that expression outside the loop routine, in a position to be executed prior to the loop itself being executed.

SUMMARY OF THE INVENTION

It is therefore an object of the invention to provide a method for optimizing the performance of a computer system by compiling programs to minimize cache misses.

It is another object of the invention to optimize operation of a cache memory in a computer systems when handling compiled programs having looping instructions contained therein.

It is another object of the invention to optimize performance of loop instructions when a set-associative cache memory is used in a computer system.

In accordance with these and other objects of the invention, a method is provided for optimizing operation of a compiled computer program which contains compiled loop instructions and which operates in conjunction with a cache memory. Where certain blocks of the contents of a main memory unit are transferred to a higher-speed cache memory for execution of the program, the invention is intended to minimize cache misses for loop instructions, that is, minimize situations in which a reference to memory cannot be satisfied by the cache memory.

The set of compiled instructions are examined to identify loop instructions, and particularly to identify at least one set of loop instructions which is smaller than a cache-memory block. The main-memory boundaries for the set of loop instructions are determined so that the identified set of loop instructions can be located to fall within those boundaries to avoid cache misses when the loop instructions are executed.

According to one aspect of the invention, loop-invariant instructions are identified and removed from the set of loop instructions.

According to another aspect of the invention, the contents of the main memory are blockwise mapped into the cache memory in a set-associative manner. For the situation where the loop instructions call a targeted main memory location, the invention contemplates arranging the contents of the main memory such that the set of compiled loop instructions containing the external-call instruction and the targeted main memory location are not on the same row of said main memory. This will prevent a cache miss when the main-memory is mapped into a set-associative cache memory. The invention also contemplates arranging the blocks of main memory in modulo (n) groups, which are mapped into corresponding locations in the cache memory unit. The invention is useful in connection with a paging system whereby memory blocks are organized as fixed-length page units which are assigned to predetermined memory locations.

BRIEF DESCRIPTION OF THE DRAWINGS

The accompanying drawings, which are incorporated embodiments of the invention and, together with the description, serve to explain the principles of the invention.

FIG. 1 is a block diagram of a computer system which uses a cache memory unit.

FIG. 2 is a memory layout diagram for an associative mapping of the contents of a main memory unit into a cache buffer memory unit.

FIG. 3 is a memory layout diagram for a set-associative mapping of the contents of a main memory unit into a cache buffer memory unit.

FIG. 4 is a diagram representing the memory map of instructions for a compiled program to be optimized according to the invention.

FIG. 5 is a memory layout diagram for a set-associative mapping in which a loop instruction and an external function called by the loop instruction are in the same row of main memory.

FIGS. 6A and 6B are flowchart showing a method according to the present invention for optimizing a compiled program having looping instructions contained therein.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

FIG. 1 shows a computer system 10 having a CPU, or execution unit, 12. A relatively small, fast cache memory unit 14 serves as a buffer memory for a main memory unit 16. The cache memory unit 14 and the main memory unit form a two-level hierarchy which has many of the properties of a virtual memory system, that is, a memory storage system with at least two memory levels which is managed by an operating system to appear to a user as one large directly-addressable main memory unit. Virtual memory systems use a two-level hierarchy of a so-called main memory with relatively small memory capacity and a much larger secondary memory. A computer-system user, who often programs the system with the aid of a high-level source language, sees the memory functions of the system as a single virtual or logical memory of very large capacity. That virtual memory system is addressed by a set of logical addresses L specified by the user high-level program. The physical storage locations in the memory units are identified by a set of physical addresses P. In operation, a virtual memory system is implemented by automatic mapping of the logical addresses L in the physical addresses P.

To achieve faster system performance using a cache memory unit, a high percentage of memory references must be satisfied by the cache memory. Cache memory units have some important distinctions over main-secondary memory units including: a smaller difference between the access times of the memory components; control by high-speed logic hardware circuits, as opposed to software control; transparency to both applications programmers and to system programmers; organization of the memory units into relatively small pages; and direct access by the CPU to both the cache unit and the main memory unit, so that the CPU can directly access information in the main memory when the cache memory unit does not contain the required information.

FIG. 2 shows a main memory unit 20 and a cache buffer memory unit 22 arranged as an associative mapping. The main memory unit 20 is defined as a (m) by (n) array of blocks of information. The cache memory unit 22 is an (n) one-dimensional, linear array. Corresponding to every block in the cache memory unit 22 is a tag address specifying which block is currently in the cache memory block. The addresses assigned to a cache memory unit are typically held in a memory map contained in a tag buffer memory. If the block address in the tag buffer memory matches an address generated by the CPU for a desired word, the corresponding cache-memory data is made available to the CPU. If no match is found, the required memory information must be obtained from the main memory unit by transferring the block of information containing the desired word into the cache memory unit. If the cache memory unit is full, an appropriate block must be displaced in accordance with a predetermined replacement scheme.

For an associative mapping as shown in FIG. 2, any block in the main memory unit 20 can be located in any block of the cache memory 22. As a consequence, for an associative scheme, every address generated by the CPU is compared with all of the tag memory locations and the tag memory field must cover all of the main memory blocks. For an associative scheme, the tag buffer is an associative memory, also known as a content-addressable memory CAM. A CAM is a memory structure in which the information stored therein is accessed by using the contents of the memory, generally a subfield of the memory, as an address, or key. Associative memories are expensive and require more extensive control logic than a set-associative scheme described hereinbelow.

FIG. 3 shows a set-associative mapping of a main memory unit 30 into a cache buffer memory unit 32. The main memory unit 30 is defined as a (m) by (n) array of blocks and the cache memory unit 32 is defined as a (n) one-dimensional linear array into which certain blocks of main-memory information are mapped. A set-associative algorithm maps each modulo (n) group of (m) main-memory 30 blocks into a corresponding row of the cache memory unit 32. The bits of the CPU address which cover the sets (n) also select a row of the cache memory unit 32. A tag buffer is used to select the (m) dimension of the desired block. If the block address in the tag buffer matches the address generated by the CPU, the contents of the cache buffer are make available. If no match occurs, the CPU must wait while the appropriate information is obtained from the main memory unit. When this occurs, the block containing the desired word is transferred into the cache memory unit. If the cache memory unit location is full, it is overwritten with data from the main memory 30.

FIG. 4 represents an exemplary memory map 40 showing the physical address space P for a main memory unit into which are mapped the logical address L of a compiled program. The compiled program and its data sets are transformed into a set of contiguous word sequences to be stored in a main memory unit. The physical address space is represented as a linear sequence, or one-dimensional array, of address numbers 0,1, ... ,n−1. Reference numerals 42, 44, 46 represent block boundaries which are selected, for example, as the page boundaries of a paged memory allocation system. A paging system uses predetermined fixed-length blocks called pages and assigns them to fixed regions of memory called page frames. Paging uses simpler memory allocation systems than memory segmentation systems which have variable block sizes because block size is not a factor in allocating memory locations for a paging system. The blocks from the main memory unit are mappped into similar blocks of a cache memory unit.

Block 48 represents a sequence of compiled loop instructions and data, which starts at memory instruction 50 and extends to instruction 51. The compiled loop instruction sequence is smaller than one block but extends During compilation, if this condition occurs for a sequence of loop instructions which is less than one cache block long, the present invention relocates the loop sequence so as to fall entirely within the boundaries of a cache block. Arrow 52 indicates that the block 48 is relocated within the boundaries 44,46 of a block of main memory which will be mapped into a cache block in the cache memory. Generally, loop invariant instructions must be moved out of the sequence of compiled instructions before the loop is relocated so that the removal of loop invariant instructions will not cause the loop to overlay a cache block boundary.

FIG. 5 shows a memory layout diagram for a set-associative mapping of a main memory unit 60 into a cache memory unit 62. A set of loop instructions are located in main-memory block (1,1). These loop instructions call an external function which is located in a targeted main-memory memory block (1,3), which block is located in the same row (1,x) as the loop instructions. Mapping both of these blocks (1,1) and (1,3) into the same cache block which is designated as block (1,0)) will result in 2N caches misses, where N is the number of passes through the loop. This main memory unit 60 so that the set of compiled loop instructions in block (1,1) and the main memory location targeted by the loop instructions are not on the same row of the main memory unit. For example, the targeted information can be moved to block (2,3) of the main memory, which is mappped into block (2,0) of the cache memory unit 62. This allows the targeted main memory location to remain in the cache memory when the loop instructions are executed so that cache misses are avoided and the loop instructions run efficiently.

FIG. 6 shows a flowchart for optimizing operation of a compiled computer program having at least one loop instruction. A group of the program statements, or code, is examined to determine whether any looping instructions are in the program. If not, another group of statements are examined. Loop instructions (i.e., the set of instructions within an execution loop) are then examined to determine if any of the instructions or expressions are loop-invariant, or not dependant on execution of the loop. If one or more loop-invariant instructions are present, they are moved out of the loop. The next step is to determine the memory locations of the boundaries of the loop instructions and compare the block size of a cache block to the size of the loop block in main memory. If the loop block in main memory is less than the size of a cache block, the loop instructions in the main memory are aligned, if necessary, to fit within the main memory boundaries of a main-memory block which is mapped into a single cache block. For the case where the main-memory loop instructions are greater than one cache block, the loop instructions are aligned, if necessary, to minimize number of cache blocks used to execute the loop and to thereby minimize cache-block misses.

If the mapping between the main memory unit and the cache memory unit is set-associative and if the loop instructions in main memory have an external-call instruction, the external call instruction is relocated in main memory so that it is not on the same row of main memory as the loop instructions. This permits the loop instructions to refer to the external-call location without causing a cache miss.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. A method of optimizing utilization of a cache memory unit in a computer system running a compiled computer program having loop instructions, said computer system having a main memory unit, which has an array of blocks of a predetermined block size, and having a cache memory unit with a multiplicity of blocks of said predetermined size, comprising the steps of:

storing a set of compiled loop instructions of a compiled computer program in said main memory unit;

locating a set of compiled loop instructions which is stored in the main memory unit and which is smaller than the predetermined block size of said cache memory unit;

denoting the memory boundaries of said identified set of compiled loop instructions within said main memory unit;

moving the instructions of said located set of compiled loop instructions so that said instructions are stored within the boundaries of one of said predetermined blocks of said main memory unit;

loading said identified set of compiled loop instructions into said cache memory unit; and running said identified set of loop instructions in said computer system;

thereby optimizing operation of said cache memory unit when said identified set of compiled loop instructions is loaded into said cache memory unit and the identified set of loop instructions is run in said computer system and cache misses are avoided for said identified set of loop instructions.

2. The method of claim 1 including the steps of:

locating, within said identified set of compiled instructions, a loop-invariant expression which yields the same result independent of the number of times that said identified set of compiled loop instructions is executed; and moving said loop-invariant expression outside of the boundaries of said one of said predetermined blocks of said main memory unit, within which boundaries are stored said identified set of compiled of loop instructions.

3. The method of claim 1, wherein said blocks in said main memory unit are arranged in rows each containing a multiplicity of memory blocks, and wherein said cache memory unit is a set-associative cache memory unit containing a memory block corresponding to each of said rows of blocks in said main memory unit;

the method further including the steps of locating external-call instructions within said located set of compiled loop instructions, said external call instructions each calling a targeted main memory location; and moving the contents of said compiled computer program stored within said main memory such that the set of compiled loop instructions containing said external-call instructions and said targeted main memory locations are not on the same row of said main memory;

whereby when said block of main memory is transferred to the cache memory unit, the targeted memory location is contained within the cache memory simultaneously with the set of compiled loop instructions.

4. The method of claim 1, wherein said compiled computer program includes a plurality of sets of compiled loop instructions, which are stored in the main memory unit and transferred to said cache memory unit during running of said compiled computer program.

5. The method of claim 1, wherein said compiled loop instructions include a larger set of loop instructions which is greater than the predetermined block size of said cache memory unit, the method further including the step of moving instructions of said larger set of instructions within said main memory so that said moved instructions fall within the boundaries of a minimum number of predetermined blocks of main memory.

* * * * *